(12) United States Patent  (10) Patent No.: US 6,229,136 B1
Banks  (45) Date of Patent: May 8, 2001

(54) ROTARY LENS POSITIONING MECHANISM WITH LENS POSITION FEEDBACK

(75) Inventor: John E. Banks, Arlington, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 0 days.

(21) Appl. No.: 09/313,017

(22) Filed: May 17, 1999

(51) Int. Cl.$^7$ .................................................. G02B 7/02
(52) U.S. Cl. ........................ 250/216; 359/694; 359/822
(58) Field of Search ..................... 250/216; 359/694–697, 359/811, 819, 822–826

(56) References Cited

U.S. PATENT DOCUMENTS

| | | | |
|---|---|---|---|
| 3,600,067 | 8/1971 | Heine | 351/12 |
| 3,776,619 | 12/1973 | Heine | 351/12 |
| 3,782,829 | 1/1974 | Herriott | 356/127 |
| 3,813,169 | 5/1974 | Kaestner | 356/127 |
| 4,474,440 | * 10/1984 | Kramer et al. | 353/94 |
| 4,538,889 | 9/1985 | Heine et al. | 351/205 |
| 4,606,624 | * 8/1986 | Wood | 351/234 |
| 4,621,924 | 11/1986 | Williams | 356/153 |
| 5,748,306 | 5/1998 | Louis | 356/247 |
| 6,111,706 | * 8/2000 | Incera et al. | 359/811 |

* cited by examiner

Primary Examiner—Stephone B. Allen
(74) Attorney, Agent, or Firm—Williams, Morgan & Amerson, P.C.

(57) ABSTRACT

A rotary lens positioning mechanism with lens position feedback, in one embodiment, includes a worm-gear drive motor assembly, a Geneva gear drive assembly, a lens carrier disk, and a lens position feedback means. The worm-gear drive motor assembly includes a drive motor, which for some applications can be an N-scale model-train locomotive electric drive motor, and a worm pinion gear. The lens position feedback means, in one embodiment, includes two sensors each comprising an emitter-detector light-emitting diode (LED) pair, two reflective surfaces, and a computer. As the lens carrier disk rotates, the LED emitter of the sensor emits light to the reflective surface. If the light hits a reflective surface, it is reflected back to the LED detector of the sensor, turning that particular sensor on. The on and off signals of the respective sensors are translated into binary "words" to indicate which lens is currently intersecting the light. The computer reads the binary words and compares them to a table of known lens positions to determine whether the lens carrier disk is in a desired lens position. If the lens carrier disk is in a desired position, the computer stops the lens carrier disk from rotating. If not, then the computer rotates the lens carrier disk to another lens position.

19 Claims, 8 Drawing Sheets

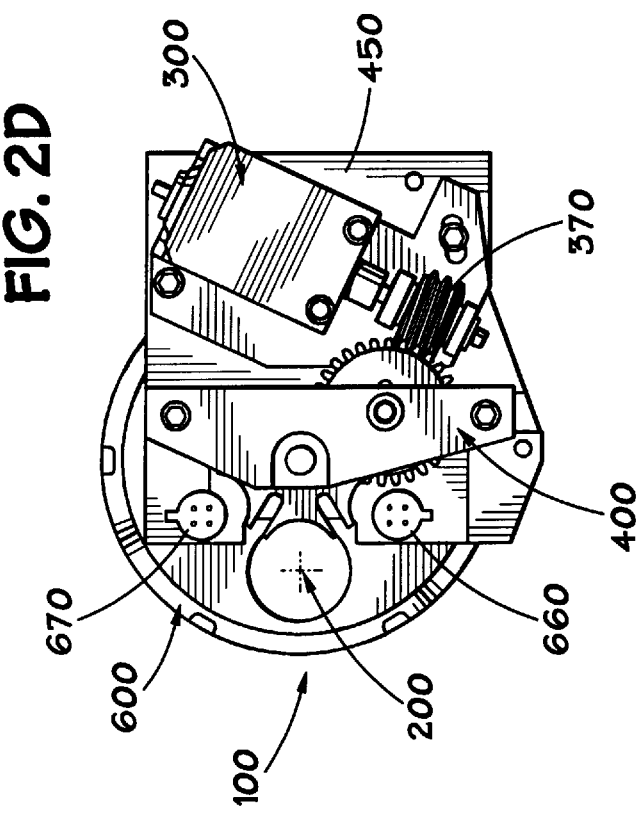
FIG. 2D
FIG. 2C
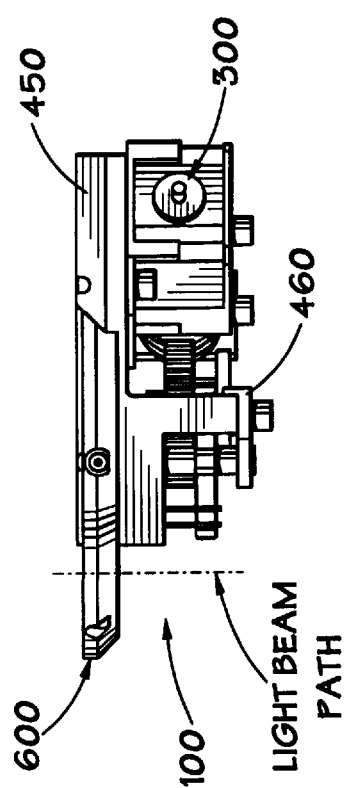
FIG. 8
| | LENS (610) "ON" | LENS (620) "ON" | LENS (630) "ON" | NO LENS "ON" |
|---|---|---|---|---|
| SENSOR (660) | ON | ON | OFF | OFF |
| SENSOR (670) | ON | OFF | ON | OFF |

US 6,229,136 B1

ROTARY LENS POSITIONING MECHANISM WITH LENS POSITION FEEDBACK

1. BACKGROUND OF THE INVENTION

1.1 Field of the Invention

The present invention was conceived in the course of attempting to develop a lowcost, lightweight, reliable, rotary lens positioning mechanism for a laser targeting sensor. In hindsight, with the benefit of this disclosure, it will be apparent that the invention also relates to other lens positioning applications, e.g., in cameras, telescopes, and other devices.

1.2 Description of Related Art

Laser targeting sensors provide the capability of directing a laser beam through a lens to a target, e.g., a SCUD missile launcher or a T72 Russian tank on a battlefield. As a laser transmitter in the targeting sensor scans the laser beam across the target, a receiver (either integral to or separate from the sensor) receives optical signals reflecting from the target. These reflecting signals are then analyzed to provide a geometrical information of the target. In some laser sensors, different lenses are preferred for different applications. Multiple lenses can be mounted in a sensor with a suitable lens positioning mechanism. Lens position mechanisms are used to move selected lenses into position.

2. SUMMARY OF THE INVENTION

The invention relates to a rotary lens positioning mechanism with lens position feedback. In one embodiment the mechanism includes a worm-gear drive motor assembly, a Geneva gear drive assembly, a lens carrier disk, and a lens position feedback means. The worm-gear drive motor assembly includes a drive motor, which for some applications can be an N-scale model-train locomotive electric drive motor, and a worm pinion gear.

The lens position feedback means, in one embodiment, includes two sensors each comprising an emitter-detector light-emitting diode (LED) pair, two reflective surfaces, and a computer. As the lens carrier disk rotates, the LED emitter of the sensor emits light to the reflective surface. If the light hits a reflective surface, it is reflected back to the LED detector of the sensor, turning that particular sensor on. The on and off signals of the respective sensors are translated into binary "words" to indicate which lens is currently intersecting the light. The computer reads the binary words and compares them to a table of known lens positions to determine whether the lens carrier disk is in a desired lens position. If the lens carrier disk is in a desired position, the computer stops the lens carrier disk from rotating. If not, then the computer rotates the lens carrier disk to another lens position.

3. BRIEF DESCRIPTION OF THE DRAWINGS

FIG. 2C is a side view, and FIG. 2D is a bottom view of the illustrative rotary lens positioning mechanism.

Figure 1:
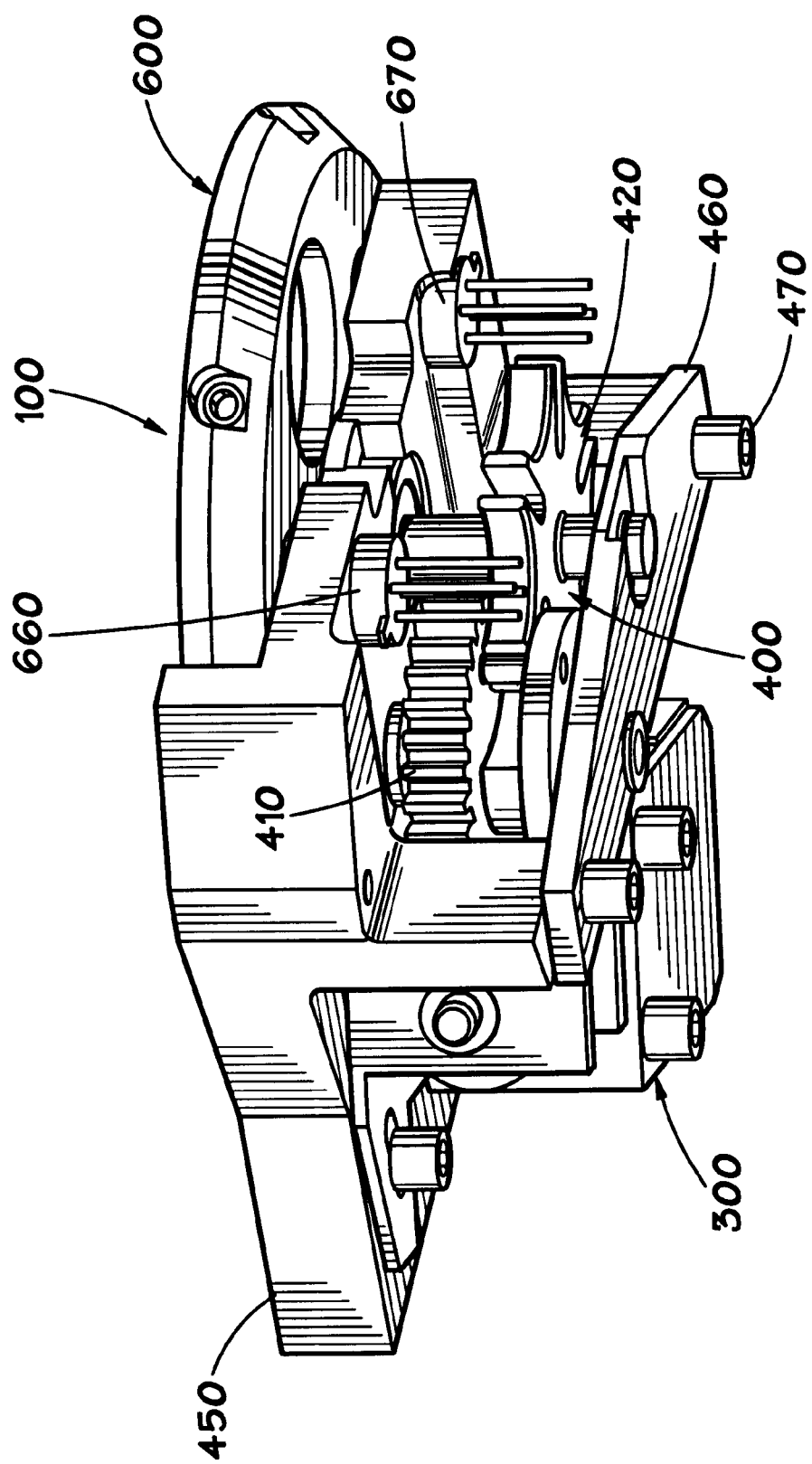
FIG. 1 is an elevated perspective side view of one illustrative embodiment of a rotary lens positioning mechanism with lens position feedback in accordance with the invention.
Figure 2B:
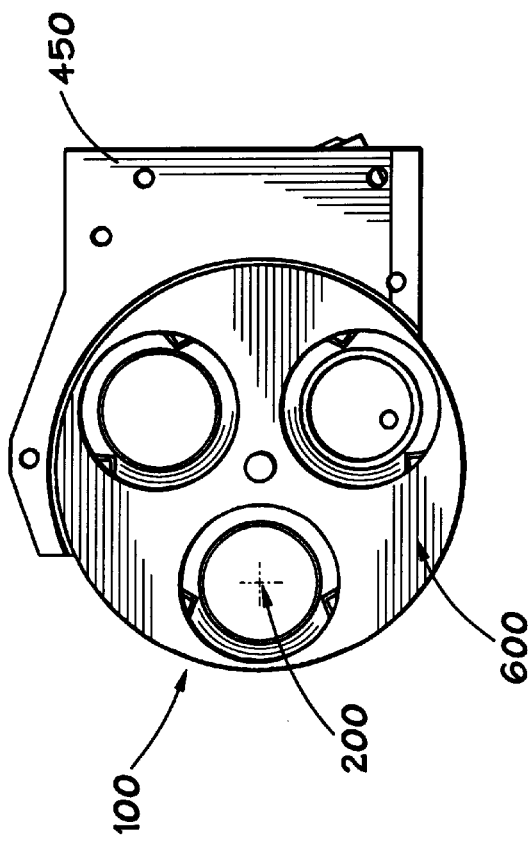
FIG. 2B is a top view.
Figure 2A:
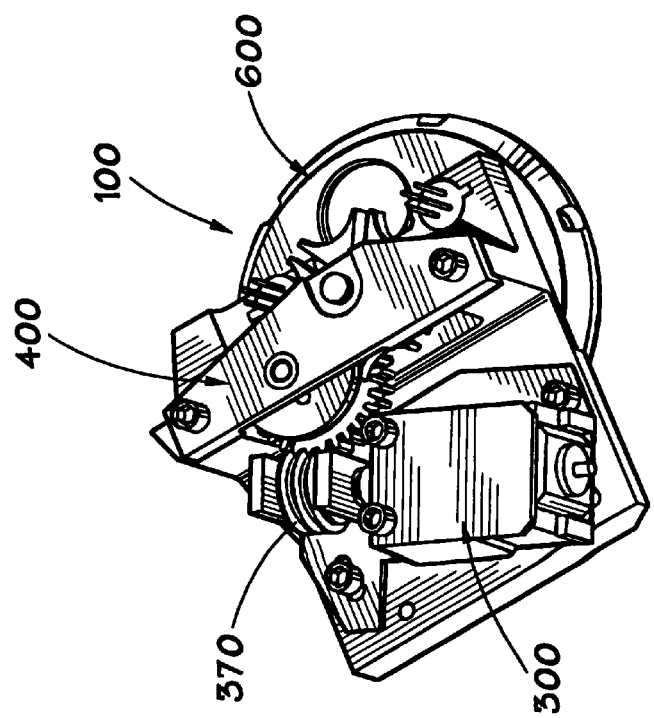
FIG. 2A is a bottom perspective view.
Figure 3B:
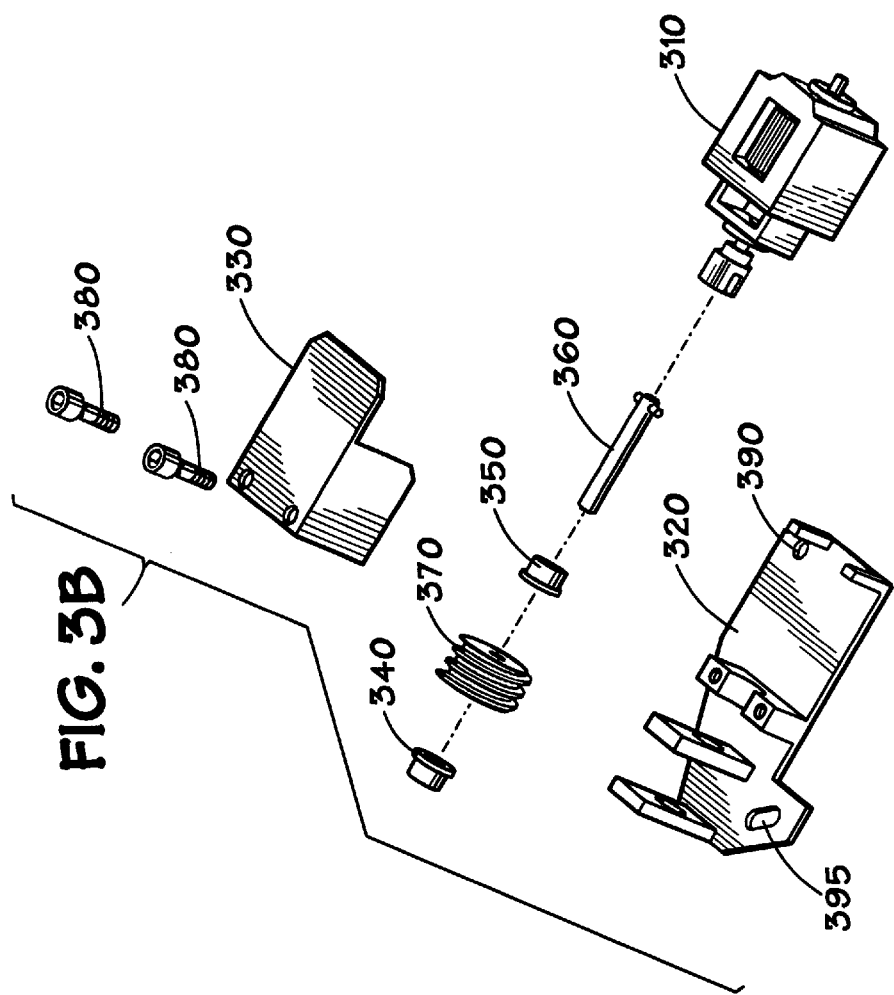
Figure 3A:
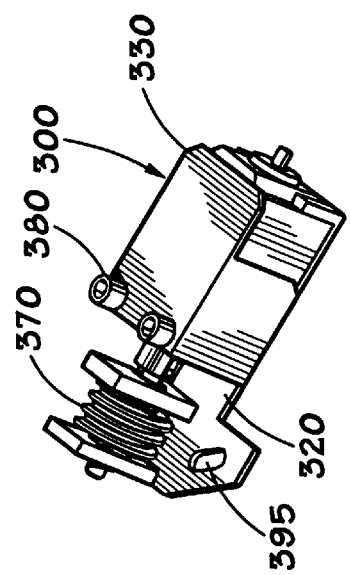

FIG. 3, comprising FIG. 3A and FIG. 3B, is a perspective view and an exploded view, respectively, of a worm gear drive motor assembly used in the illustrative rotary lens positioning mechanism.

Figure 4A:
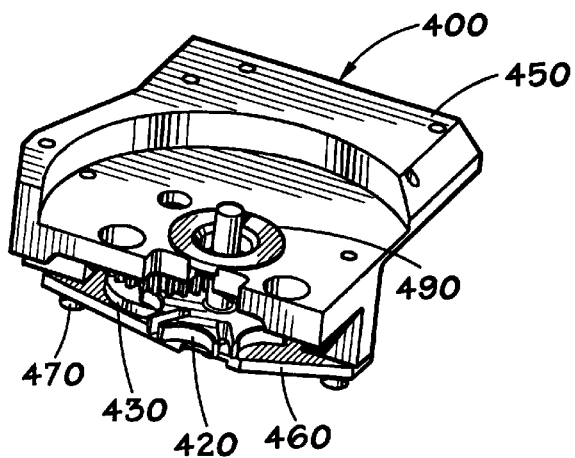
Figure 4B:
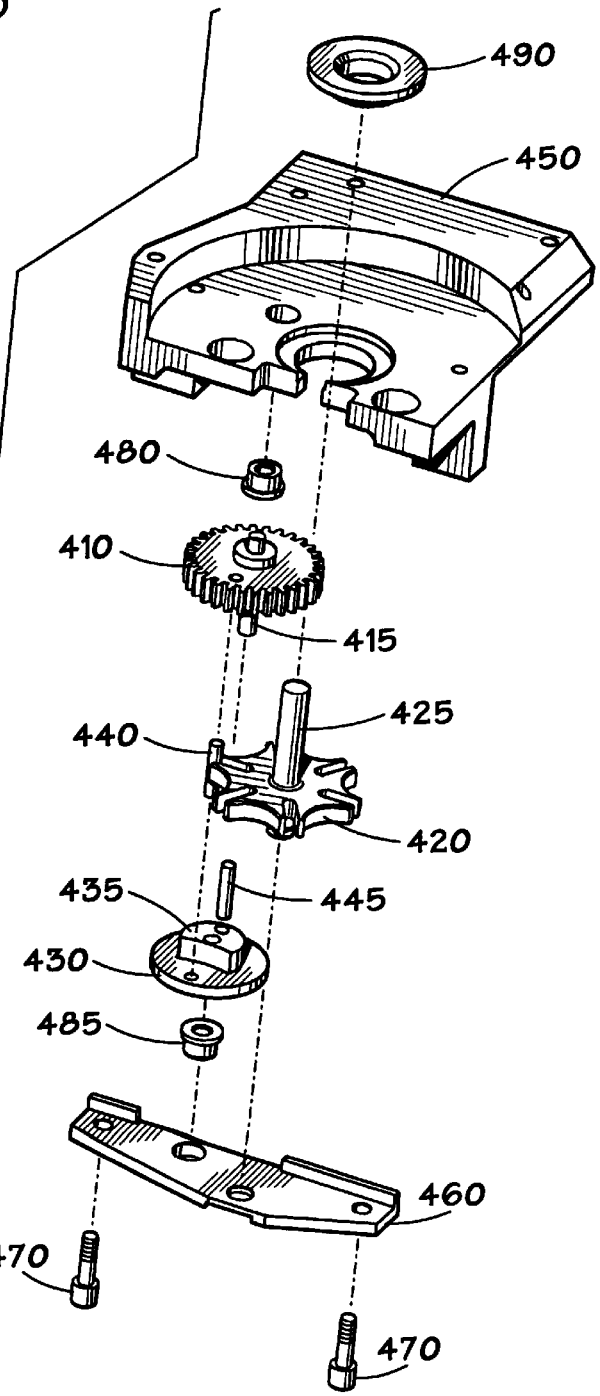

FIG. 4A is a perspective view, and FIG. 4B is an exploded perspective view, of a Geneva gear drive assembly used in the illustrative rotary lens positioning mechanism.

Figure 5A:
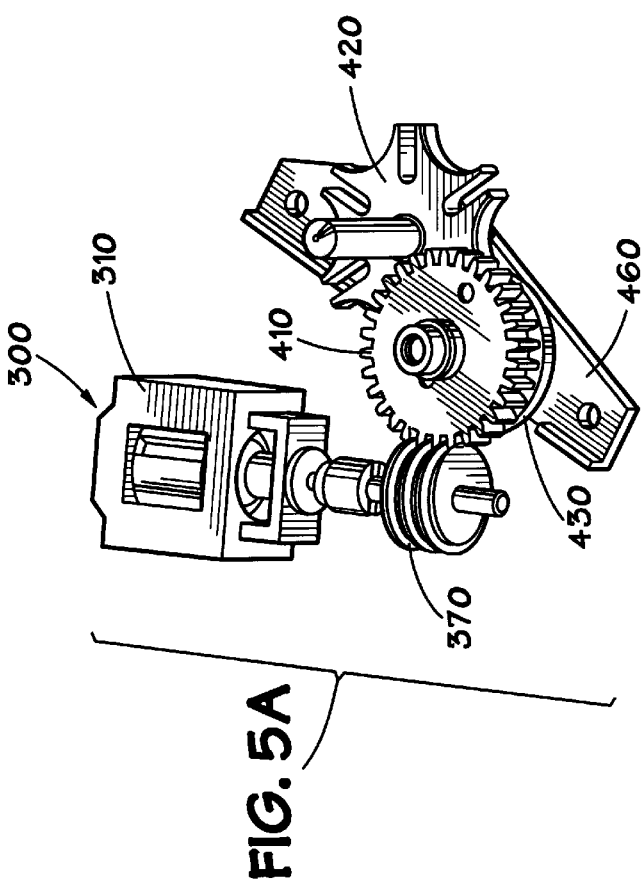
Figure 5B:
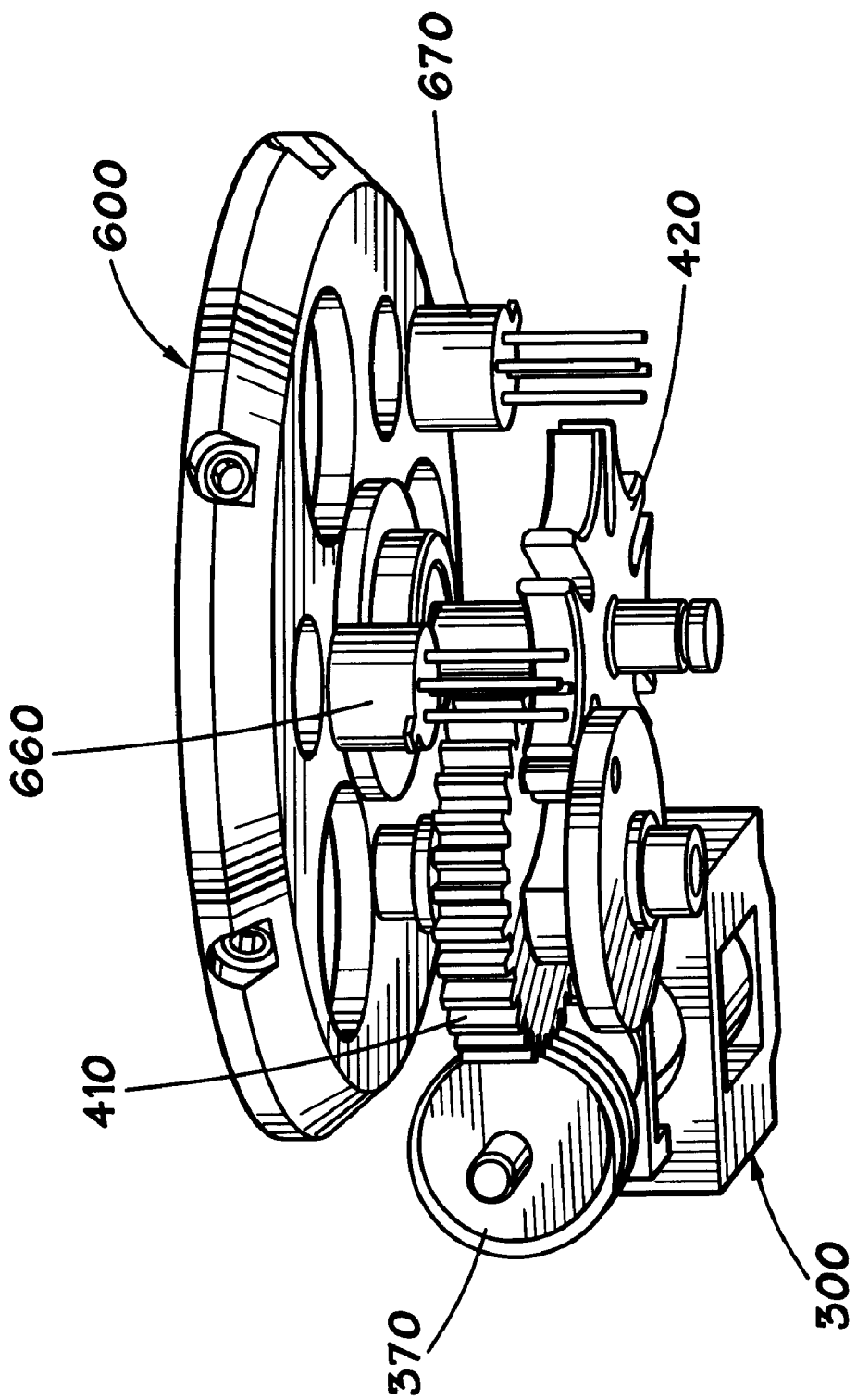

FIG. 5A is a top perspective view, and FIG. 5B is a side perspective view, of the worm-gear drive motor assembly interacting with the drive gear of the Geneva gear drive assembly.

Figure 6B:
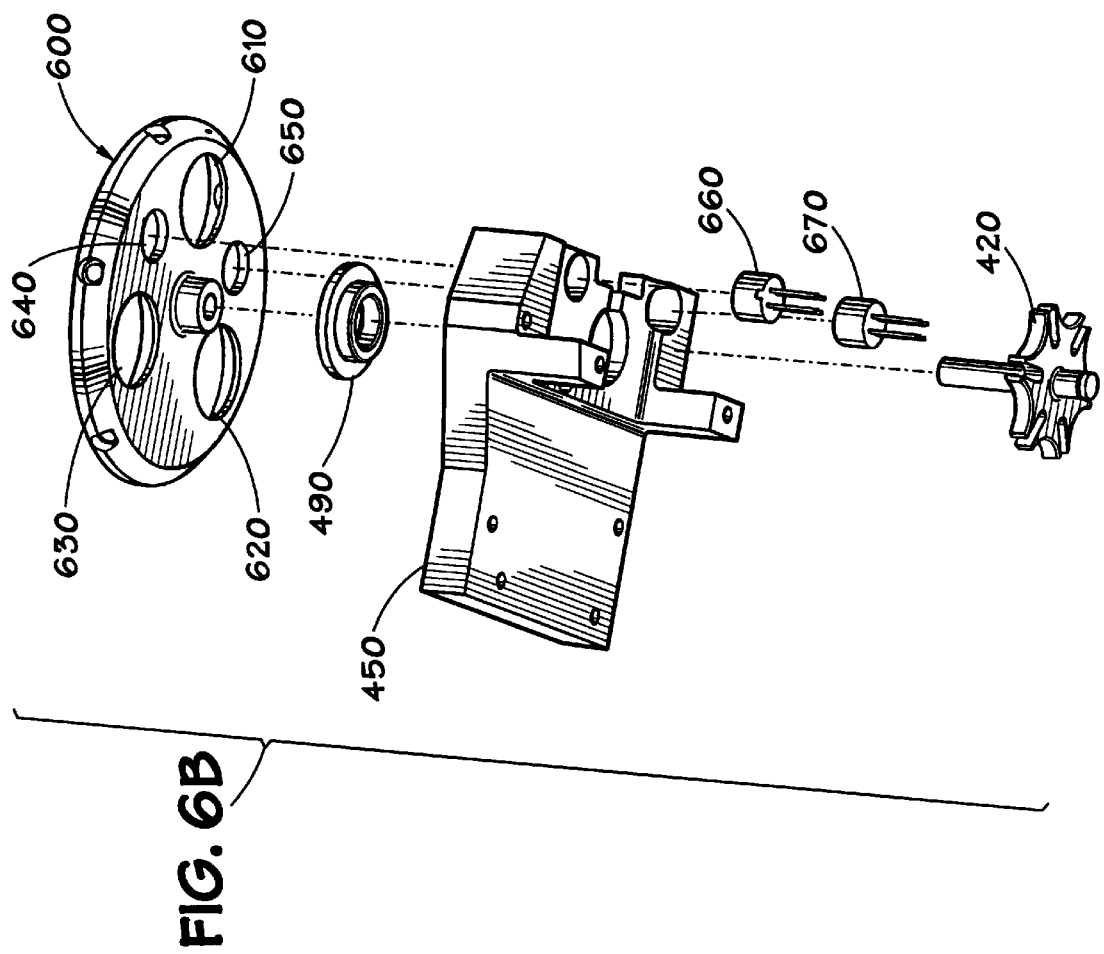
Figure 6A:
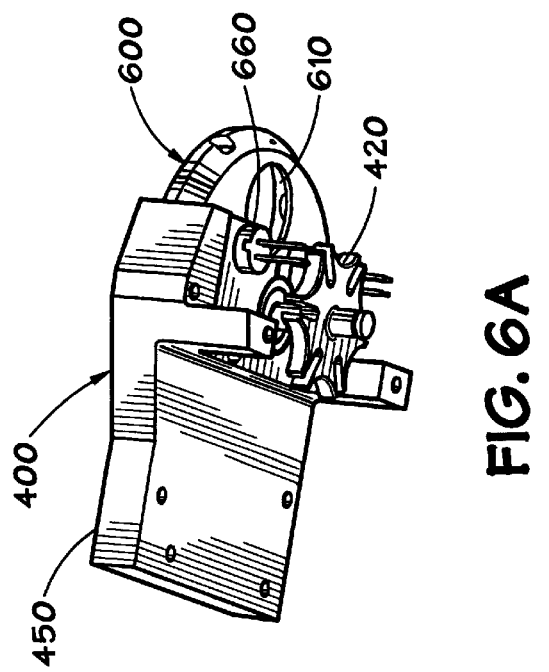

FIG. 6A is a perspective view, and FIG. 6B is an exploded perspective view, of the lens carrier disk and its components.

Figure 7:
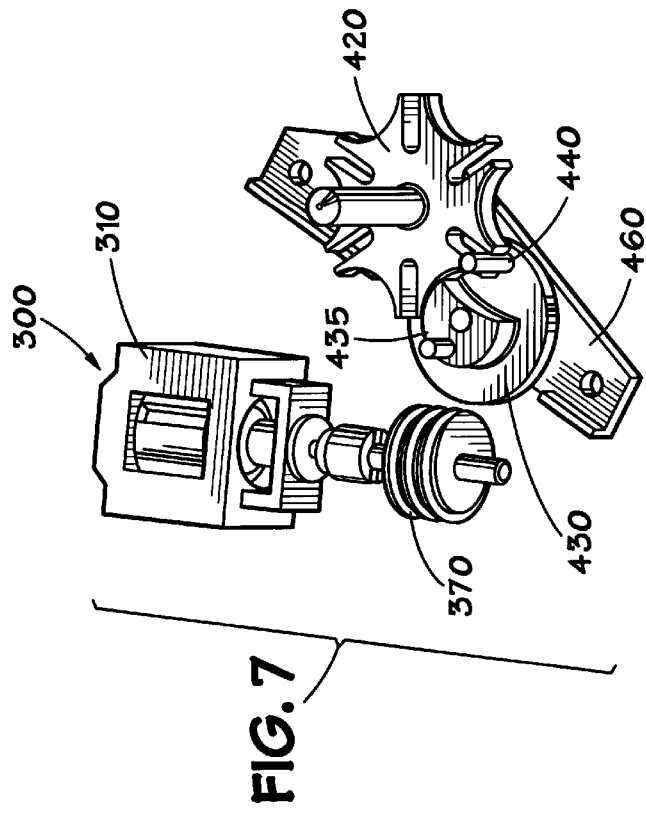

FIG. 7 is a perspective view of the Geneva crank wheel interacting with the Geneva wheel.

FIG. 8 is an illustrative with table of three aperture positions for the rotary lens positioning mechanism.

While the invention is susceptible to various modifications and alternative forms, specific embodiments thereof have been shown by way of example in the drawings and are described in detail in this specification. It should be understood, however, that the description of specific embodiments is not intended to limit the invention to the particular forms disclosed. The intention is to cover all modifications, equivalents, and alternatives falling within the spirit and scope of the invention as defined by the appended claims.

4. DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

4.1 General Description

Turning to the figures, FIG. 1 and FIGS. 2A through 2D illustrate various views of an embodiment of a rotary lens positioning mechanism with lens position feedback 100 in accordance with the present invention. The lens positioning mechanism 100 includes a worm-gear drive motor assembly 300, a Geneva gear drive assembly 400, and a lens carrier disk 600.

In an embodiment in accordance with the present invention, the worm-gear drive motor assembly 300 drives the Geneva gear drive assembly 400, causing the lens carrier disk 600 to rotate to a desired location. As the lens carrier disk 600 rotates, the positioning mechanism 100 identifies which specific lens, mounted on the lens carrier disk 600, is in the field of regard of the laser beam (the path of the laser beam is shown in FIGS. 2A through 2D by line 200) and positions that lens in a specific high-tolerance position. As is known in the art, high-tolerance positioning is desirable, because if the beam is being used to illuminate a target, and the reflected signals are being analyzed to obtain a geometrical data of the target, it is desirable to know exactly where the laser beam is being directed at any given instant in time.

4.2 Worm-Gear Drive Motor Assembly and its Components

FIG. 3 illustrates the worm-gear drive motor assembly 300 in greater detail. The worm-gear drive motor assembly 300 includes a drive motor 310. In one prototype embodiment of the present invention, the drive motor 310 is an N-scale model locomotive electric drive motor, which is low in cost, compact in size, and has the required torque capacity to drive the rotary lens positioning mechanism 100. However, a smaller motor may be used as the drive motor 310, which would result in a more compact drive motor assembly 300 and rotary lens positioning mechanism 100, depending on the torque and speed requirements.

The worm-gear drive motor assembly 300 may further include a two-piece motor bracket 320, 330, which clamps around the motor 310 and supports the worm pinion shaft bearings 340, 350, a worm pinion shaft 360, a worm pinion gear 370, and a pair of assembly screws 380. Alternatively, the two-piece motor bracket 320, 330, the worm pinion shaft bearings 340, 350, the worm pinion shaft 360 and the assembly screws 380 may be manufactured as part of the drive motor 310. The two-piece motor bracket 320, 330 may employ a hole 390 and a slotted hole 395, which are used to attach the drive motor assembly 300 to the mounting base 450. (see FIG. 4B) The slotted hole 395 allows for adjustment of gear mesh between the worm pinion gear 370 and other gears that are driven by it. The worm-gear drive motor assembly 300 may use gears other than the worm pinion gear 370, e.g., a spur gear.

An advantage of using the worm-gear drive motor assembly 300 is that it is not likely to back-drive. That is, the worm-gear drive motor assembly 300 provides a self-locking action for the lens carrier disk 600 once the desired aperture position is in position. When the desired aperture is in position, the worn-gear drive motor assembly 300 holds the drive gear 410 (shown in FIG. 4B) in position, which in turn holds the lens carrier disk 600 in position. This is accomplished when the partial cyclindrical structure 435 is engaged or caught in one of the arms on the Geneva wheel 420. Thus, using the worm-gear drive motor assembly 300 to drive the drive gear 410 reduces or eliminates the need for a mechanism to keep the drive gear 410 from rotating when it is not being driven.

4.3 The Geneva Gear Drive Assembly And Its Components

FIGS. 4A and 4B illustrate the Geneva gear drive assembly 400 in greater detail. In accordance with the invention, the Geneva gear drive assembly 400 comprises a drive gear 410, a Geneva wheel 420, Geneva crank wheel 430, a mounting base 450, a bearing/retainer plate 460, and assembly screws 470.

The drive gear 410 is driven by the worm pinion gear 370 of the worm-gear drive motor assembly 300, as shown in FIG. 5A and FIG. 5B. The drive gear 410 has an axle 415 (shown in FIG. 4B), which is also shared by the Geneva crank wheel 430.

The Geneva crank wheel 430 mounts flush against the drive gear 410, as also illustrated in FIG. 5A and FIG. 5B.

The Geneva gear drive assembly 400 further comprises a drive pin 440 and a securing pin 445 to help lock the drive gear 410 and the Geneva crank wheel 430 in rotation.

A bearing 480 is connected to the top portion of the axle 415 of the drive gear 410 and another bearing 485 is connected to the bottom portion of the axe 415, underneath the Geneva crank wheel 430.

In the illustrative embodiment, the Geneva wheel 420 has six arms, as shown in FIG. 4B; it may include more or fewer arms with appropriate modifications However, a Geneva wheel 420 with three arms cannot be manufactured easily. The Geneva wheel 420 is positioned next to the drive gear 410 and the Geneva crank wheel 430 such that a portion of the Geneva wheel 420, i.e., a portion of one of the arms, is movably restrained in an axial motion between the drive gear 410 and the Geneva crank wheel 430, as shown in FIG. 5B.

The Geneva wheel 420 further comprises an integral axle 425. A bearing 490 is coupled to the top portion of the integral axle 425 to help hold the Geneva wheel 420 to the mounting base 450.

The Geneva crank wheel 430 is parallel to and offset from the integral axle 425 of the Geneva wheel 420.

The Geneva crank wheel 430 has a partial cylindrical structure 435 protruding up from its center. As illustrated in FIG. 7, this partial cylindrical structure 435 holds the Geneva wheel 420 in place, i.e., preventing the Geneva wheel 420 from rotating, when drive pin 440 is not engaged in one of the arms on the Geneva wheel 420. Thus, although the Geneva crank wheel 430 rotates through a full 360 degrees, only a portion of its full 360 degree rotation creates a rotation of the Geneva wheel 420. For a Geneva wheel 420 with six arms, only 60 degrees of the Geneva crank wheel's 430 full 360 degrees rotation creates a corresponding 60 degrees rotation in the Geneva wheel 420. This occurs when the drive pin 440 is engaged or caught in one of the arms on the Geneva wheel 420.

Sensors, as described in more detail below in connection with FIG. 6B, are activated or inactivated depending upon the position of the lens carrier disk 600. In the illustrative embodiment, the lens carrier disk 600 is oriented relative to the Geneva wheel 420 such that the laser beam would intersect the lens when the partial cylindrical structure 435 holds the Geneva wheel 420 in place. If it is necessary for the lens to remain in a specific lens/aperture position for a long period of time, the drive motor 310 is simply turned off.

At this point, a binary "word" is generated to indicate that a particular aperture is in position. Identifying the lens position through the use of binary word created by multiple sensors allows the drive motor 310 to be activated or inactivated as desired.

It will be apparent to those of ordinary skill having the benefit of this disclosure that one of the advantages of using the Geneva gear drive assembly 400 is that it provides intermittent motion, allowing large tolerances in the worm pinion gear 370 rotational position without affecting the lens positioning accuracy. This is made possible since the lens positioning accuracy is determined by the interface tolerance between the Geneva crank wheel 430 and the Geneva wheel 420, and not by the drive motor 310. That is, it is not necessary to stop the drive motor 310 in a specific position. The angular rotation position of drive motor 310, therefore, does not need to stop in a close tolerance position, and may vary by many degrees. In accordance with the embodiment of the present invention, over one thousand degrees of motor position variance can be tolerated. Thus, using the worm-gear drive motor assembly 300 and the Geneva gear drive assembly 400 to rotate the lens carrier disk 600 eliminates the necessity for using an expensive, precisely controlled stepper motor.

4.4 Lens Carrier Disk and its Components

FIGS. 6A and 6B illustrate the lens carrier disk 600 in greater detail. The lens carrier disk 600 is firmly attached to the integral axle 425 of the Geneva wheel 420 and indexed to a specific position relative to the Geneva wheel 420. Thus, the angular position of the lens carrier disk 600 is maintained with the Geneva wheel 420. In an embodiment in accordance with the present invention, the lens carrier disk 600 is pressed fit onto the integral axle 425 of the Geneva wheel 420. However, any means of mechanically coupling the lens carrier disk 600 to the integral axle 425 will suffice.

Typically, a lens carrier disk 600 employs at least one aperture position. In a specific embodiment in accordance with the present invention, the lens carrier disk 600 has three aperture positions 610, 620, 630. Theoretically, a Geneva wheel 420 with three or more arms could be used to operate with the lens carrier disk 600 with three aperture positions 610, 620, 630. For example, a four-armed Geneva wheel may be employed with one of the four arms simply going unused. Nevertheless, in the illustrated embodiment, a Geneva wheel 420 with six arms is selected to operate with the lens carrier disk 600 so that the Geneva wheel 420 may keep its overall diameter small. With this particular combination, the six-armed Geneva wheel 420 rotates through two aperture positions per lens change. Moreover, this combination is likely to prevent occlusion of the lenses and optical path.

In another embodiment in accordance with the present invention, a diffraction grating is mounted in each aperture position 610, 620, 630. A diffraction grating is a type of lens that has a number of small microgrooves, much like the grooves on a Fresnel lens except that they are parallel rather than circular. As a laser beam passes through each diffraction grating, the microgrooves of the grating break the beam down into multiple beams. In hindsight, it will be apparent to those of ordinary skill having the benefit of this disclosure that other things can be mounted into each aperture position 610, 620, 630, such as camera lenses, filters, mirrors, apertures, fluid nozzles, or anything that can be selectively rotated for precise angular positioning.

4.5 Lens Position Feedback Mechanism and its Components

FIG. 6B further illustrates two sensors 660, 670 and two reflective surfaces 640, 650. In one embodiment, the sensors 660, 670 are electro-optical, e.g., photodiodes. Electro-mechanical devices could also be employed, i.e., microswitches, electromagnetic or hall effect switches. Furthermore, the sensors 660, 670 have a quantity relationship with the lenses to be positioned in the path of the laser beam.

Each sensor 660, 670 is either turned on or off according to the lens carrier rotational position. The on or off signals are translated into binary "words" to indicate which lens is currently intersecting the beam. Each aperture position correlates to a unique binary "word."

This information is then used by a processor or computer, not shown, to determine whether the lens carrier disk 600 is in a desired aperture position. That is, the processor or computer either stops the lens carrier disk 600 at that position or rotates it further to another aperture position.

In accordance with the present invention, the sensors 660, 670 and the reflective surfaces 640, 650 are spaced as far apart angularly as the lenses themselves relative to the Geneva wheel axle 425. For a lens mechanism with three aperture positions, they are spaced 120 degrees apart.

In an embodiment in accordance with the present invention, the sensors 660, 670 are identical emitter-detector light-emitting diode (LED) units. Thus, they are capable of emitting lights and detecting the lights reflected from the reflective surfaces 640, 650.

Six different positions of alignment are available in the illustrated embodiment. However, the lens carrier disk 600 rotates only into three different positions of alignment leaving every other position unused. As the lens carrier disk 600 rotates into three different positions of alignment, all three aperture positions 610, 620, 630 ultimately rotate into the position that is occupied by aperture position 610 illustrated in FIG. 6B. This method of rotation was selected primarily to reduce the drive motor size requirement and to reduce the number of binary position sensors to two. To identify all six possible positions would require five binary position sensors, which was not necessary for this embodiment.

Furthermore, as the lens carrier disk 600 rotates, it moves the reflective surfaces 640, 650 into and out of alignment with the sensors 660, 670. As shown in FIG. 6B, aperture position 610 is in the path of the laser beam, and thus, both of the reflective surfaces 640, 650 are reflecting the lights from sensors 660, 670 back into their detectors. Both sensors 660, 670 are turned on at this point and the two voltage signals are translated into the binary word 1-1.

In this embodiment, the first character of the binary word relates to sensor 660 and the second character to sensor 670. However, any order of sensor to character relation may be used as long as that definition is used consistently.

If the lens carrier disk 600 rotates 120 degrees counterclockwise, aperture position 620 moves to where aperture position 610 used to be, the reflective surface 640 moves to the left (out of the light path from sensor 660), and the reflective surface 650 moves to where the reflective surface 640 used to be. At this point, sensor 660 is receiving light while sensor 670 is not, and the two signals are translated into the binary word 1-0.

As illustrated in a truth table for a three aperture positions system in FIG. 8, each aperture position has been designated its own binary word. That is, the binary word 1-1 correlates to the aperture position 610; the binary word 1-0 correlates to the aperture position 620; and the binary word 0-1 correlates to the aperture position 630. The binary word 0-0 correlates to no particular aperture position since both reflective surfaces 640, 650 are out of position with the sensors 660, 670. This truth table is useful for the computer or controller to activate/inactivate the drive motor 310.

In one embodiment in accordance with the present invention, the binary identification of aperture position typically requires a pair of sensor and reflective surface for a lens position mechanism with N-1 apertures/lenses. That is, it is desirable to employ two pairs of sensor and reflective surface for a lens position mechanism with 3 lenses to create a two character binary word.

The lens carrier disk 600, however, may include any number of aperture positions so long as the number of aperture positions is one more than the number of sensors and no greater than the number of arms on the Geneva wheel 420, so that there would be a sufficient number of binary word combinations for each aperture position.

The reflective surfaces may be positioned in a manner such that certain binary word combinations are designated for aperture positions that are out of position. For example, with three sensors and four aperture positions, four specific combinations of binary words would be generated to correlate with four aperture positions. That is, the binary words for the corresponding aperture positions are: 0-1-1, 1-0-1, 1-1-0, and 1-1-1. The rest of the binary word combinations would correspond to no particular aperture position.

In another embodiment, the lens carrier disk 600 has the capacity to rotate randomly or bi-directionally by powering the rotary lens positioning mechanism 100 in a desired direction until the sensors 660, 670 are activated to produce a unique binary word. At this point, the controlled processor or computer shuts off the power to the rotary lens positioning mechanism 100.

4.6 Remarks

The lens positioning mechanism described above has many advantages. For example, the Geneva gear drive assembly provides intermittent motion, allowing large tolerances in the worm pinion gear rotational position without affecting the lens positioning accuracy. As another example, the worm-gear drive motor assembly is not likely to backdrive, because the worm-gear drive motor assembly provides a self-locking action for the lens carrier disk once the desired aperture position is in position. The lens positioning mechanism is low in cost and power consumption and compact in design.

The particular embodiments disclosed above are illustrative only, as the invention may be modified and practiced in different but equivalent manners apparent to those skilled in the art having the benefit of the teachings. Furthermore, no limitations are intended to the details of construction or design shown, other than as described in the claims below. It is therefore evident that the particular embodiments disclosed above may be altered or modified and all such variations are considered within the scope and spirit of the invention. Accordingly, the protection sought is as set forth in the claims below.

What is claimed is:

1. A lens positioning mechanism comprising:
   (a) a drive gear having an axle;
   (b) a Geneva wheel having an axle and drive arms;
   (c) a generally circular carrier having an axis parallel to the axle of the Geneva wheel, the carrier being mechanically coupled at its axis to the axle of the Geneva wheel;
   (d) the carrier having at least two aperture positions;
   (e) a Geneva crank wheel having an axle in common with the drive gear; and
   (f) the Geneva crank wheel axle being parallel to and offset from the Geneva wheel axle.

2. The lens positioning mechanism of claim 1, further comprising:
   (g) a plurality of sensors generating output signals, wherein the output signals correlate to the aperture positions;
   (h) a machine-readable table of known aperture positions; and
   (i) means for reading the output signals of the sensors and for comparing the output signals with the table of known aperture positions to determine whether the carrier is in a specified aperture position.

3. The lens positioning mechanism of claim 2, further comprising a drive motor assembly having a drive motor, wherein the means for reading and comparing selectively switches the drive motor on or off as a function of the aperture position relative to a specified aperture position.

4. The lens positioning mechanism of claim 2, wherein each sensor comprises a light-emitting diode emitter/detector pair.

5. The lens positioning mechanism of claim 4, further comprising a plurality of reflective surfaces, each adapted to reflect light emitted from the light-emitting diode emitter back to the light-emitting diode detector, wherein the detector generates the output signals.

6. The lens positioning mechanism of claim 5, wherein the reflective surfaces are mounted on the carrier directly facing the sensors.

7. The lens positioning mechanism of claim 3, wherein the drive motor assembly further comprises a worm pinion gear.

8. The lens positioning mechanism of claim 7, wherein the worm pinion gear drives the drive gear.

9. The lens positioning mechanism of claim 3, wherein the drive motor is an N-scale model locomotive electric drive motor.

10. The lens positioning mechanism of claim 1, wherein the Geneva wheel is co-axial with the carrier at its center axis.

11. The lens positioning mechanism of claim 1, wherein a portion of the drive arm of the Geneva wheel is movably restrained between the drive gear and the Geneva crank wheel.

12. The lens positioning mechanism of claim 1, wherein the Geneva wheel comprises six arms.

13. The lens positioning mechanism of claim 1, wherein the Geneva crank wheel comprises a partial cylindrical member protruding up from the middle of the top portion of the Geneva crank wheel and adapted to engage with the arm of the Geneva wheel to prevent the Geneva wheel from rotating.

14. The lens positioning mechanism of claim 1, further comprising a drive pin interposed between the drive gear and the Geneva crank wheel.

15. The lens positioning mechanism of claim 14, wherein the drive pin is adapted to engage with the arm of the Geneva wheel.

16. The lens positioning mechanism of claim 14, further comprising means for rotating the Geneva wheel simultaneously with the Geneva crank wheel when the drive pin engages with the arm of the Geneva wheel.

17. The lens positioning mechanism of claim 14, wherein the Geneva wheel rotates simultaneously with the Geneva crank wheel when the drive pin engages with the arm of the Geneva wheel.

18. A lens positioning mechanism comprising:
   (a) a drive gear having an axle;
   (b) a Geneva wheel having an axle and drive arms;
   (c) a generally circular carrier having an axis parallel to the axle of the Geneva wheel, the carrier being mechanically coupled at its axis to the axle of the Geneva wheel;
   (d) the carrier having at least two aperture positions;
   (e) a Geneva crank wheel having an axle in common with the drive gear;
   (f) the Geneva crank wheel axle being parallel to and offset from the Geneva wheel axle;
   (g) a plurality of sensors generating output signals, wherein the output signals correlate to the at least two aperture positions;
   (h) a machine-readable table of known aperture positions; and
   (i) means for reading the output signals of the sensors and for comparing the output signals with the table of known aperture positions to determine whether the carrier is in a specified aperture position.

19. A lens positioning mechanism comprising:
   (a) a drive gear having an axle;
   (b) a Geneva wheel having an axle and drive arms;
   (c) a generally circular carrier having an axis parallel to the axle of the Geneva wheel, the carrier being mechanically coupled at its center axis to the axle of the Geneva wheel center axis;
   (d) the carrier having at least two aperture positions;
   (e) a Geneva crank wheel having an axle in common with the drive gear;
   (f) the Geneva crank wheel axle being parallel to and offset from the Geneva wheel axle; and
   (g) a drive motor assembly having a drive motor, wherein the drive motor drives the drive gear.

* * * * *